US012779473B2

(12) United States Patent
Sikora

(10) Patent No.: US 12,779,473 B2
(45) Date of Patent: Nov. 3, 2026

(54) SYSTEMS AND METHODS FOR SEPARATING BULLETS FROM BACKSTOP MATERIAL

(71) Applicant: 1054610 BC LTD., Langley (CA)

(72) Inventor: Dustin Sikora, Langley (CA)

(73) Assignee: 1054610 BC LTD., Langley (CA)

( * ) Notice: Subject to any disclaimer, the term of this patent is extended or adjusted under 35 U.S.C. 154(b) by 358 days.

(21) Appl. No.: 18/406,117

(22) Filed: Jan. 6, 2024

(65) Prior Publication Data

US 2024/0181468 A1 Jun. 6, 2024

Related U.S. Application Data

(63) Continuation of application No. PCT/IB2022/056353, filed on Jul. 8, 2022.

(60) Provisional application No. 63/203,132, filed on Jul. 9, 2021.

(51) Int. Cl.
*B03B 5/40* (2006.01)
*F41J 13/00* (2009.01)

(52) U.S. Cl.
CPC ................. *B03B 5/40* (2013.01); *F41J 13/00* (2013.01)

(58) Field of Classification Search
CPC .. B03B 5/40; B03B 1/04; B03B 5/442; B03B 5/28; F41J 13/00
See application file for complete search history.

(56) References Cited

U.S. PATENT DOCUMENTS

| | | | | | |
|---|---|---|---|---|---|
| 2,209,618 | A * | 7/1940 | Vogel | B03B 5/40 | 209/172.5 |
| 4,248,696 | A * | 2/1981 | White | B03D 1/01 | 209/1 |
| 4,728,109 | A | 3/1988 | Simonetti | | |
| 5,047,145 | A * | 9/1991 | Hwang | B03D 1/02 | 209/39 |
| 5,128,027 | A * | 7/1992 | Halaka | B03B 1/04 | 423/710 |
| 5,171,020 | A | 12/1992 | Wojcinski | | |
| 5,255,787 | A * | 10/1993 | Sims | B03B 5/623 | 209/208 |
| 6,837,496 | B2 | 1/2005 | Larson et al. | | |
| 9,132,453 | B1 | 9/2015 | Bouslog | | |
| 9,707,594 | B2 * | 7/2017 | Wooldridge | B07B 9/02 | |

FOREIGN PATENT DOCUMENTS

| | | | | |
|---|---|---|---|---|
| EP | 1990599 | A1 * | 11/2008 | B03B 5/40 |
| JP | 2003053272 | A * | 2/2003 | F41J 13/00 |
| JP | 2007209863 | A | 8/2007 | |

* cited by examiner

*Primary Examiner* — Patrick H Mackey
(74) *Attorney, Agent, or Firm* — Todd A. Rattray; Oyen Wiggs Green & Mutala LLP

(57) ABSTRACT

Systems and methods for recovering bullets from a backstop are disclosed. In one example embodiment of a method, fired bullets and backstop material are collected from the backstop. The fired bullets and backstop material may be vacuumed. The collected bullets are separated from the backstop material based on buoyancy of the collected bullets and backstop material in a liquid. The liquid may have a density that is greater than the density of the backstop material and less than the density of the collected bullets.

20 Claims, 5 Drawing Sheets

SYSTEMS AND METHODS FOR SEPARATING BULLETS FROM BACKSTOP MATERIAL

CROSS-REFERENCE TO RELATED APPLICATION

This application is a continuation of Patent Cooperation Treaty (PCT) application No. PCT/IB2022/056353 having an international filing date of 8 Jul. 2022 and entitled SYSTEMS AND METHODS FOR SEPARATING BULLETS FROM BACKSTOP MATERIAL, which in turn claims priority from, and for the purposes of the United States of America the benefit under 35 U.S.C. § 119 in relation to, U.S. application No. 63/203,132 filed 9 Jul. 2021 and entitled SYSTEMS AND METHODS FOR SEPARATING BULLETS FROM BACKSTOP MATERIAL. All of the applications referred to in this paragraph are hereby incorporated herein by reference.

FIELD

This invention relates to systems and methods for recovering fired bullets from backstops. Example embodiments provide a liquid separation process and system for separating recovered bullets from backstop material.

BACKGROUND

Shooting ranges (e.g. indoor shooting ranges; outdoor shooting ranges; etc.) typically comprise a backstop which is designed to absorb energy of fired bullets and stop fired bullets from leaving a live shooting area. A common backstop design is to use large quantities of ½ inch to 1 inch thick rubber chunks (e.g. similar in size and texture to coarse bark mulch) that is deposited about three feet (about 1 meter) thick on a sloped platform to form the backstop. In some cases a majority of the rubber chunks are about 1¼ inch thick. In some cases a majority of the rubber chunks are less than about 2 inches thick. Such backstops are commonly known as “crumb rubber”, “rubber berm” or “granular trap” backstops. The rubber covered platform typically rises as it slopes away from shooters from bottom to top (e.g. from floor to ceiling) at angles in the range of about 20° to about 35°. In some cases the backstop may also comprise sand, dirt, gravel and/or the like (e.g. as part of a berm in an outdoor shooting range).

After a period of time it becomes necessary to remove fired bullets from the backstop. Having large quantities of fired bullets within the backstop may create a ricochet hazard (e.g. a just fired bullet may ricochet off bullets within the backstop). A ricochet may potentially cause severe injury or death to a person located within the range or damage to property. It may also be necessary to remove fired bullets from a backstop if a particular shooting range is being decommissioned, renovated, etc. Additionally, or alternatively, recovered fired bullets may be sold as scrap metal providing range operators with an additional source of income.

Known processes for removing bullets from such backstops involve vacuuming the backstop material so that the fired bullets are exposed and can be manually removed. Such processes are slow, messy, labour intensive and create hazardous airborne particles that require intensive preparation and safety precautions for containment. Many bullets (e.g. lead-copper bullets) comprise lead which is a potentially hazardous material. Thus the removal process may expose operators to hazardous lead dust and/or other hazardous airborne particles. Operators of such prior art systems are advised or required to wear hazmat suits with respirators when recovering bullets from the backstop.

There remains a need for improved systems and methods for removing bullets from backstops.

SUMMARY

This invention has a number of aspects. These aspects include, without limitation:

- systems and methods for recovering fired bullets from a backstop;
- systems and methods for separating collected bullets from collected backstop material(s) and/or other gangue materials;
- systems and methods for separating collected backstop material from gangue materials;
- a liquid separation method;
- a modular system design.

One aspect of the invention provides a method for recovering bullets from a backstop. The method may comprise collecting fired bullets and backstop material from the backstop. The method may also comprise separating the collected bullets and backstop material based on buoyancy of the collected bullets and backstop material in a liquid. The liquid may have a density that is greater than the density of the backstop material and less than the density of the collected bullets.

In some embodiments the liquid comprises a calcium chloride solution. In some embodiments the calcium chloride solution comprises about 0.6:1 by weight to about 4.5:1 by weight of water to calcium chloride.

In some embodiments the liquid comprises at least one silicate.

In some embodiments the liquid comprises a surfactant additive. In some embodiments the additive comprises sodium carbonate. In some embodiments the additive comprises sodium bicarbonate.

In some embodiments the liquid further comprises phosphates or orthophosphates.

In some embodiments the liquid comprises deionized water.

In some embodiments the method comprises separating the collected backstop material from gangue material based on buoyancy of the backstop material and gangue material in a second liquid. The second liquid may have a density that is greater than the gangue material and less than the density of the backstop material.

In some embodiments the second liquid comprises fresh water.

In some embodiments the second liquid comprises a calcium chloride solution.

In some embodiments the second liquid comprises at least one silicate.

In some embodiments the second liquid comprises sodium carbonate or sodium bicarbonate.

In some embodiments the method comprises re-applying the separated backstop material to the backstop.

In some embodiments the method comprises drying the separated backstop material prior to re-applying the separated backstop material to the backstop.

In some embodiments the method comprises separating the collected bullets based on material composition of the bullets. In some embodiments the method comprises separating steel bullets from non-steel bullets using magnets.

In some embodiments the method comprises shredding lead-copper bullets.

In some embodiments the method comprises puncturing outer copper jackets of lead-copper bullets.

In some embodiments collecting the fired bullets and backstop material comprises vacuuming a selected region of the backstop.

In some embodiments collecting the fired bullets and backstop material comprises mechanically collecting the fired bullets and backstop material from the backstop.

In some embodiments the method comprises autonomously vacuuming the selected region according to a set plan.

In some embodiments the method comprises determining locations of bullets within the backstop by scanning the backstop using one or more sensors.

In some embodiments the sensors comprise inductive proximity sensors.

Another aspect of the invention provides a system configured to perform the method having any of the features or combinations of features described above.

In some embodiments the system comprises a plurality of modules which are coupleable together. Each of the modules may be configured to perform at least one distinct function.

Another aspect of the invention provides a system for collecting bullets from a backstop. The system may comprise an intake configured to receive bullets and backstop material collected from the backstop. The system may also comprise a separation tank comprising a liquid having a density that is greater than the density of the backstop material but less than the density of the collected bullets.

In some embodiments the liquid comprises a calcium chloride solution.

In some embodiments the calcium chloride solution comprises about 0.6:1 by weight to about 4.5:1 by weight of water to calcium chloride.

In some embodiments the liquid comprises at least one silicate.

In some embodiments the liquid further comprises a surfactant additive.

In some embodiments the additive comprises sodium carbonate.

In some embodiments the additive comprises sodium bicarbonate.

In some embodiments the liquid comprises phosphates or orthophosphates.

In some embodiments the liquid comprises deionized water.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the technology described herein provides a method for efficiently and safely recovering fired bullets from a shooting range backstop (e.g. a crumb rubber backstop or the like). The method comprises collecting fired bullets and backstop material (e.g. crumb rubber) from a desired region of a backstop and separating the collected bullets from the collected backstop material. The bullets are separated from the backstop material in a liquid. The liquid is selected to have a density such that the bullets sink within the liquid and the backstop material floats in the solution.

Figure 1:
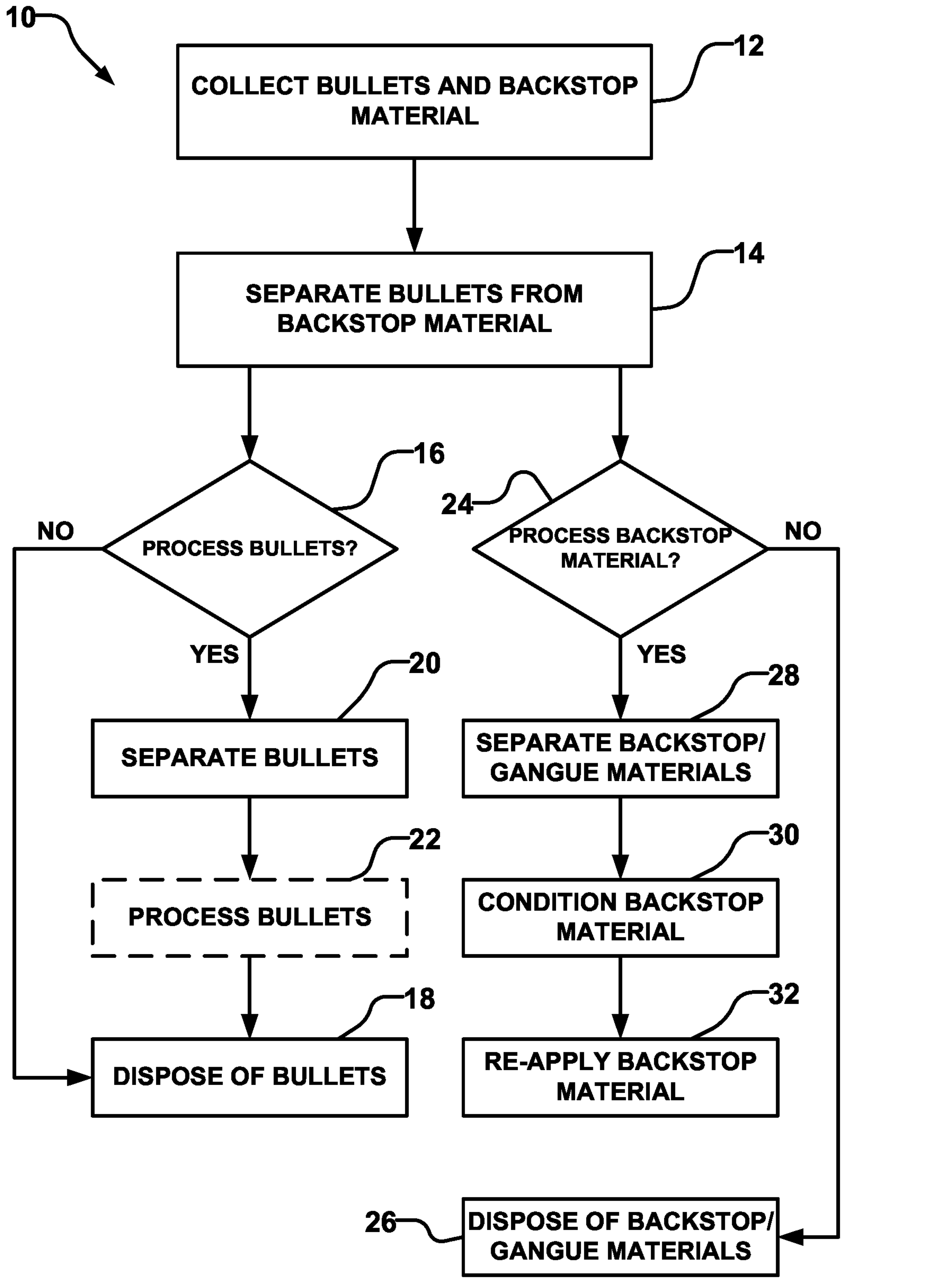
FIG. 1 is a flow chart illustrating a method according to an example embodiment of the invention.

FIG. 1 is a block diagram of an example method 10 for removing fired bullets from a backstop.

In block 12 fired bullets and backstop material from a desired region of the backstop are collected. The fired bullets and backstop material may be collected, for example, by vacuum suction and/or the like. In some embodiments the fired bullets and backstop material are collected with mechanical equipment such as an auger, a spiral conveyor, a cableveyor, a conveyor belt, a bucket elevator, loading equipment (e.g. a skid steer, backhoe, etc.), propellers, spinning blades, rotating brush wheels, paddle wheels and/or the like. In some embodiments both mechanical equipment and vacuum suction are used. For example, mechanical equipment may collect the fired bullets and backstop material on a first pass and vacuum suction may provide a second pass to collect any remaining fired bullets or backstop material.

In some embodiments block 12 collects fired bullets and backstop material from an entire backstop. In some embodiments fired bullets and backstop material is collected from only a portion of the backstop (e.g. an oval pattern at the center of each shooting lane of the range as described elsewhere herein). In some embodiments block 12 collects fired bullets and backstop material while one or more other steps of method 10 are performed simultaneously.

In block 14 collected bullets and backstop material are separated from one another using a liquid. The liquid is designed such that the collected bullets are not buoyant within the liquid (i.e. the bullets sink) while the backstop material is buoyant within the liquid (i.e. the backstop material floats). Typically gangue material (i.e. unwanted materials such as paper fiber, nylon fiber, plastic wadding, earth, sand, etc. within backstop 102) is collected with the bullets and the backstop material. Preferably, the gangue material is buoyant in the liquid and therefore also separated from the collected bullets.

The density of the liquid may at least partially be based on what materials a backstop comprises. For example, for backstops made of crumb rubber, the liquid preferably has a density that is greater than the density of crumb rubber (about 640-720 $kg/m^3$) but less than the density of steel (about 7750-8050 $kg/m^3$), copper (8940 $kg/m^3$) and lead (11343 $kg/m^3$). In some cases the liquid may also have a density that is greater than the density of earth materials forming part of the backstop (e.g. for outdoor shooting ranges having berms comprising earth materials such as sand, soil, etc.). In some such cases the liquid may have a density that is greater than the density of silica sand (about 1400-1700 kg/m$^3$) and/or quartz (about 2100-2400 kg/m$^3$) but less than the density of steel (about 7750-8050 kg/m$^3$), copper (8940 kg/m$^3$) and lead (11343 kg/m$^3$). Such liquid may advantageously allow for separation of any collected earth materials (e.g. silica sand, quartz, etc.) from the collected bullets. In some embodiments the liquid has a density from about 2000 kg/m$^3$ to about 5000 kg/m$^3$.

In some embodiments the liquid comprises a calcium chloride solution. In some embodiments the solution comprises one part calcium chloride to one part water (e.g. a 1:1 ratio by weight of calcium chloride to water). In some embodiments the solution comprises about 0.6:1 by weight to about 4.5:1 by weight of water to calcium chloride. In some embodiments the liquid solution comprises:

four parts water to one part calcium chloride by weight;
two parts water to one part calcium chloride by weight;
four parts water to three parts calcium chloride by weight;
four parts water to five parts calcium chloride by weight; and/or
two parts water to three parts calcium chloride by weight.

In currently preferred embodiments the liquid solution comprises a solution comprising about one part water to one part calcium chloride by weight to about four parts water to five parts calcium chloride by weight.

In some embodiments the liquid comprises a silicate solution (e.g. a solution comprising one or more silicates). In some embodiments the silicate solution is a stable solution that is non-corrosive. The silicate solution may advantageously have a shelf life of more than 24 hours, be non-toxic and/or inert, be chemically stable (e.g. low or no likelihood of chemical interaction and/or reaction), inexpensive, etc.

The liquid solution may comprise additives to improve separation of lead particles or other bullet materials from the backstop and/or gangue materials. For example, in some embodiments the liquid solution comprises additives such as sodium carbonate, sodium bicarbonate, etc. The additives may advantageously assist with separating fine lead dust or other particles from the backstop material and/or gangue material.

In some embodiments the liquid solution passivates one or more metals of the collected bullets. For example, the liquid solution may comprise phosphates or orthophosphates which passivate lead. The phosphates or orthophosphates may additionally, or alternatively passivate one or more metals (i.e. act as an anti-corrosive agent) which the systems described elsewhere herein may be made of.

In some embodiments the liquid solution comprises deionized water. The deionized water may reduce corrosion of the metals which make up the systems described elsewhere herein. The deionized water may also passivate collected lead and/or copper metals.

In some embodiments electrolysis is performed (e.g. using electrolysis equipment) to modify faint electrical currents which may prevent corrosion of the equipment and/or passivate metals of the equipment.

The liquid need not comprise calcium chloride in all embodiments. In some embodiments the liquid comprises other compounds such that the density of the liquid is higher than the density of the backstop material and/or gangue material but less than the density of the collected bullets. The other compounds may be non-toxic, inexpensive, easy to obtain, non-reactive, etc. As described above, the liquid may comprise one or more silicates. In some embodiments the liquid neither comprises calcium chloride nor a silicate.

In some embodiments the liquid may be agitated. Agitating the liquid may assist with separating collected bullets and/or parts of bullets from backstop material. The liquid may, for example, be agitated with rotating egg beater like attachments, swinging chains, drum agitators and/or the like.

The separated bullets are typically removed from the liquid.

Block 16 determines whether additional processing of the bullets which were separated from the backstop material is required prior to disposing of the bullets. For example, in some cases it is desirable to separate bullets made of different materials from one another (e.g. separate steel bullets from lead bullets, etc.). In some cases it is desirable to shred some bullets to assist with downstream smelting or the like of the bullets (e.g. lead-copper bullets to remove or puncture a copper jacket with a lead core).

The bullets may, for example, be shredded with a shredder comprising two inward rotating shafts having interdigitated toothed lobes. The shafts may be operated at low speed at high torque advantageously creating minimal dust. In some embodiments the shafts may also press or extrude the bullets and/or press any generated dust into a more homogenized discharge product.

If no further processing of the bullets is required the bullets are disposed of in block 18 (e.g. placed into a waste bin such as a steel drum, etc.).

If further processing of the bullets is required, different kinds of bullets may be separated from one another in block 20. Block 20 may, for example, comprise using magnets to separate steel bullets from non-steel bullets. As another example, different types of bullets may be separated based on size.

In block 22 the bullets (or a subset of the bullets) are optionally processed for disposal. For example, block 22 may comprise shredding lead copper bullets.

The processed bullets may be disposed of in block 18 for example as described above.

Block 24 determines whether any further processing of the backstop material and/or gangue material is required. If no further processing is required the backstop material and/or gangue material is disposed of in block 26. For example, the backstop material and/or gangue material may be placed into a waste container such as a steel drum. If however further processing of the backstop material and/or gangue material is required, method 10 may proceed to block 28.

In block 28 the gangue material is separated from the backstop material. The gangue material may be separated from the backstop material in a second liquid separation step using a liquid that has a density between that of the gangue material and the backstop material (e.g. crumb rubber). Preferably, the second liquid is non-toxic, inexpensive, easily obtained, non-reactive and/or the like. In some embodiments the second liquid comprises fresh water (density of 1000 kg/m$^3$). In some embodiments the second liquid comprises calcium chloride or silicates (or a similar compound) to increase the density of the second liquid (e.g. for denser backstop materials and/or gangue materials). The separated gangue material may be disposed of in a waste container (e.g. a steel drum).

In some embodiments the second liquid comprises additives. The additives may improve the separation of the gangue material and/or other fine particulate matter from the back stop material. The additives may, for example, comprise sodium carbonate, sodium bicarbonate and/or the like.

In cases where it is unnecessary to separate the gangue material from the backstop material, block 28 may be skipped.

In block 30 the backstop material may be dried and conditioned for re-application to the backstop. In some embodiments the backstop material is at least partially air dried. In block 32 the backstop material is re-applied to the backstop (e.g. method 10 may be continuous such that while removing backstop material in one area of the backstop cleaned backstop material is re-applied to another area of the backstop). In some embodiments an operator manually controls re-application of the backstop material. In some embodiments the backstop material is re-applied autonomously.

It is emphasized that FIG. 1 illustrates an example embodiment of method 10. Steps of method 10 may be performed in a different order than what is illustrated in FIG. 1. For example, in some embodiments gangue material may be separated from the backstop material (e.g. block 28) prior to separating bullets from the backstop material (e.g. block 14).

Method 10 may offer one or more advantages over conventional processes that may be used to recover bullets from backstops. For example, method 10 may offer one or more of the following benefits:

- a liquid separation process allows hazardous lead dust particles to be suppressed within the liquid used for the separation;
- a liquid separation process may be faster thereby reducing an amount of time that a range must be offline;
- a liquid separation process may be less labour-intensive;
- a liquid separation process may yield higher returns as lead dust suppressed within the liquid may be recovered thereby increasing metal recovery yields (e.g. an increase of about 20%);
- reduced need for expensive HEPA filters;
- safer operating environment for operators;
- reduced need for HAZMAT or HAZMAT-like containment procedures;
- etc.

Method 10 comprises at least one liquid separation step. Prior to disposing of a liquid used in a liquid separation step of method 10, the liquid may be filtered (e.g. via screens, strainers, centrifugal separators, paper filters, charcoal filters, osmosis and/or the like) to remove toxic or otherwise harmful substances prior to disposing of the liquid.

Figure 2:
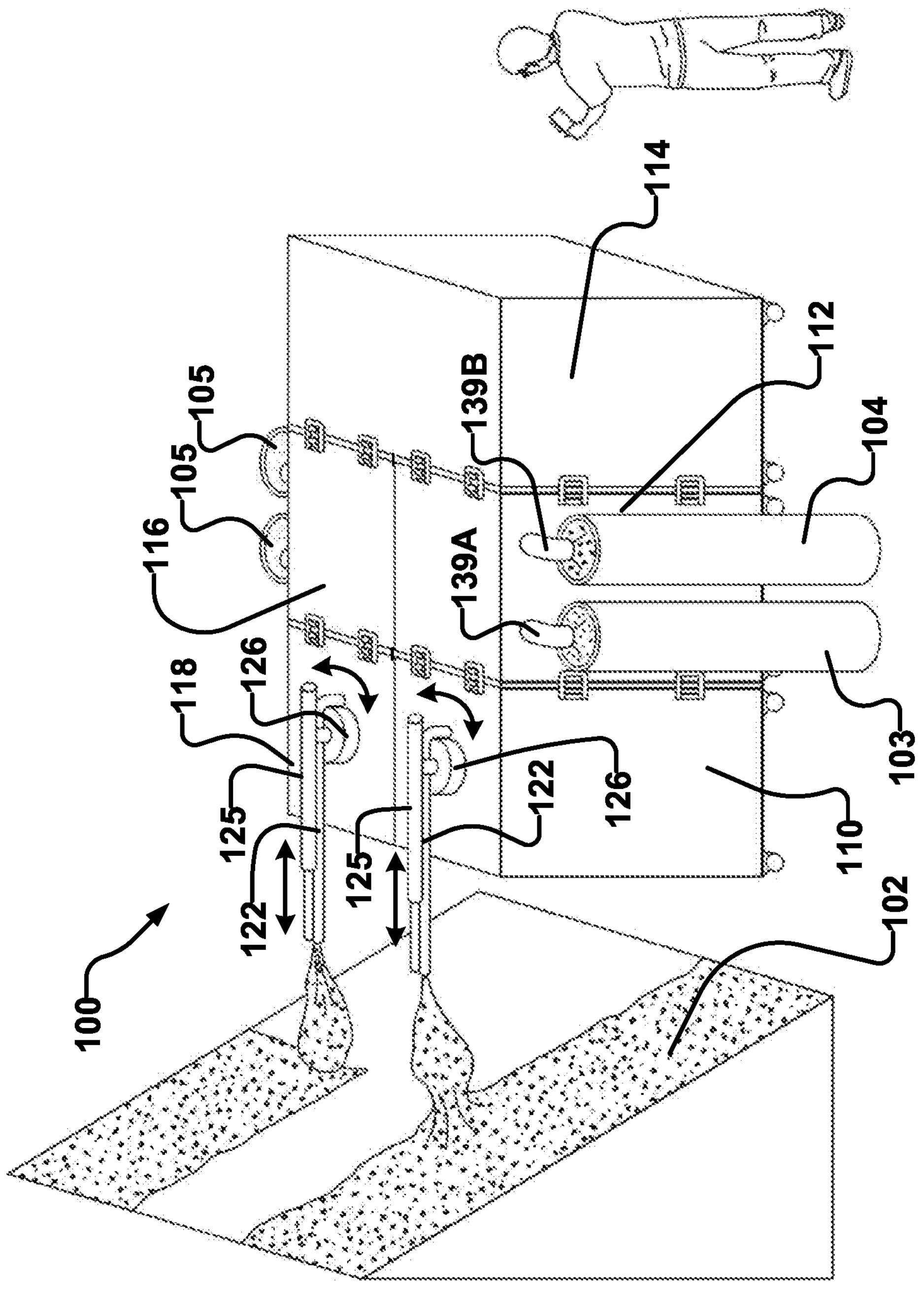
FIG. 2 is a perspective view of an apparatus for collecting fired bullets from a backstop according to an example embodiment of the invention.
Figure 3:
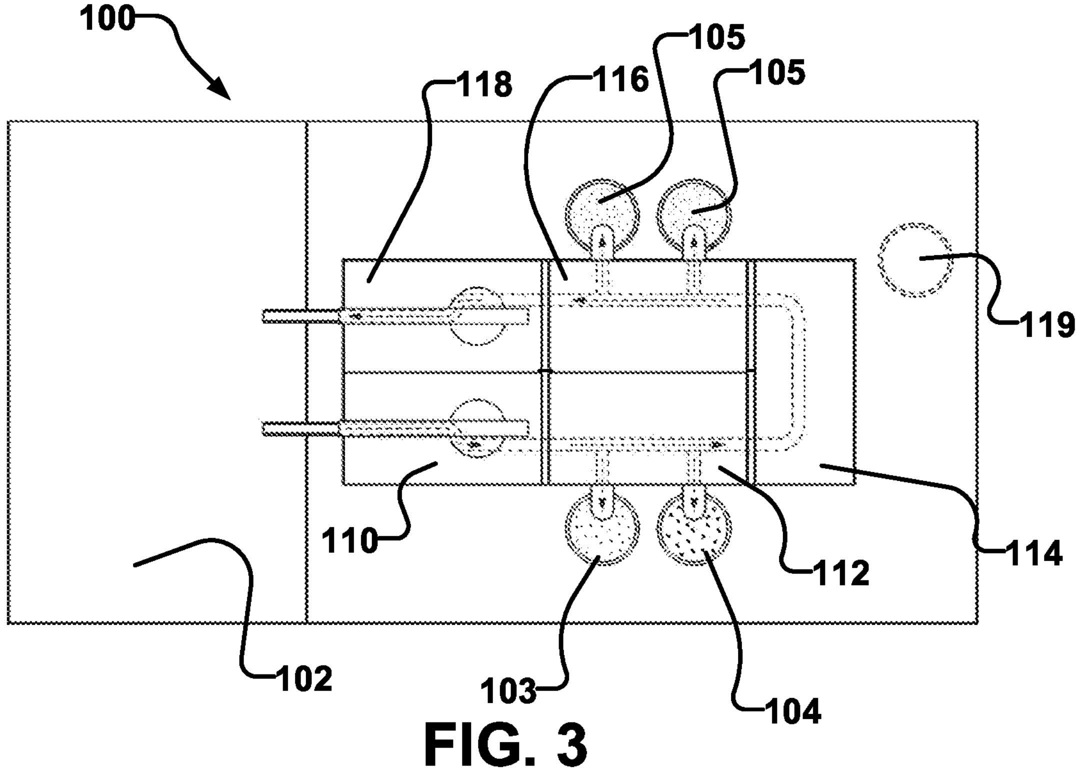
FIG. 3 is a schematic illustration of the apparatus of FIG. 2.

FIG. 2 is a perspective view of an example system 100 for collecting fired bullets from a backstop 102. FIG. 3 is a schematic illustration of system 100.

Backstop 102 may, for example, primarily comprise crumb rubber or another commercially used backstop material. System 100 may collect the fired bullets and the backstop material, separate the fired bullets from the backstop material and re-apply the backstop material to backstop 102. Advantageously system 100 may collect the fired bullets without exposing an operator of system 100 to airborne lead particles or other hazardous dust. In some embodiments system 100 is configured to perform method 10 described elsewhere herein.

As shown in FIGS. 2 and 3, system 100 comprises a number of functional units which are operable together. Collection unit 110 collects fired bullets and backstop material from backstop 102. Separation unit 112 receives the collected bullets and backstop material and separates the collected bullets from the backstop material. Intermediary unit 114 transports the separated backstop material from separation unit 112 to backstop material processing unit 116.

Backstop material processing unit 116 processes the separated backstop material for re-application to backstop 102. Application unit 118 re-applies the processed backstop material to backstop 102.

Recovered lead-copper bullets and/or lead and copper waste may be disposed of in drum 103. Recovered steel bullets and/or steel waste may be disposed of in drum 104. Waste gangue material may be disposed of in drum 105. Although each of drums 103, 104 and 105 have been described in the singular, drums 103, 104 and 105 may each comprise a plurality of drums or other waste containers. FIGS. 2 and 3 illustrate two drums 105 however system 100 may have any number of drums 105.

If it is known that a particular shooting range only comprises one type of bullet (e.g. only steel bullets, only lead-copper bullets, etc.) system 100 may be configured to account for the one type of bullet. For example, if a shooting range only comprises one type of bullet one of drums 103 and 104 may be omitted. Additionally, or alternatively, steps associated with separating different types of bullets from one another may be skipped or omitted.

Each of the functional units of example system 100 will now be described in more detail.

Figure 4:
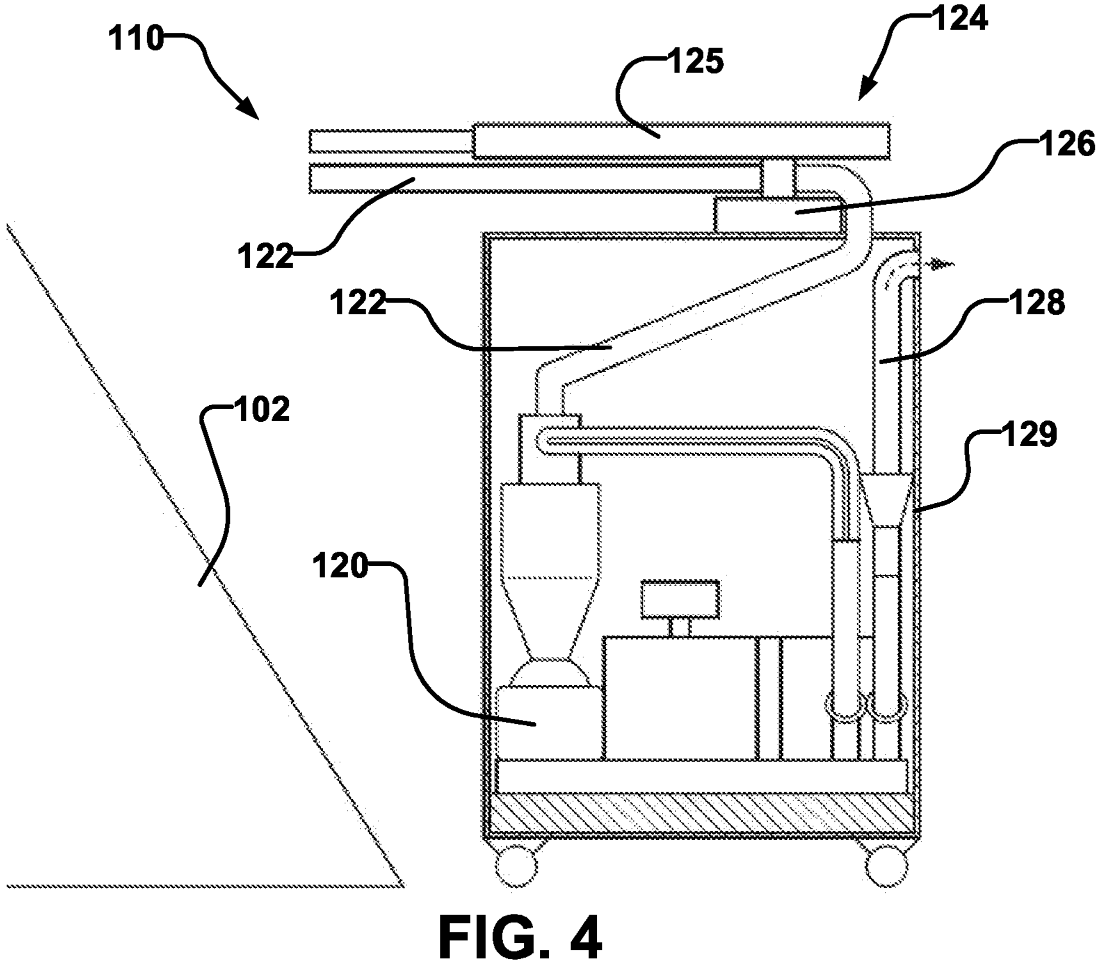
FIGS. 4 to 8 are schematic illustrations of example functional units of the apparatus of FIG. 2.

Collection unit 110 collects fired bullets (e.g. bullets 106) and backstop material (e.g. backstop material 107) from backstop 102 as described above. For example, collection unit 110 may comprise a vacuum 120 operable to vacuum up fired bullets within backstop 102 as well as the backstop material (see e.g. FIG. 4). Vacuum 120 is configured to vacuum the materials into a collection duct of vacuum 120 without the materials coming into contact with fan blades of vacuum 120. This construction may, for example prevent equipment damage, reduce the likelihood of an operator being exposed to hazardous airborne particles such as lead dust, etc.

A hose 122 of vacuum 120 may be moved across a desired region of backstop 102 to collect the fired bullets and the backstop material. Preferably hose 122 is a flexible hose. Vacuum 120 may, for example, comprise a grain vacuum (e.g. a Walinga 3510 E vacuum manufactured by Walinga Inc. of Ontario, Canada or the like), a mini-barge loader and/or the like. Vacuum 120 may comprise an air-dust liquid scrubber and/or HEPA discharge filters to capture any lead dust or other hazardous dust preventing such dust from being exhausted out into the environment.

In some embodiments an operator manually moves hose 122 across a desired region of backstop 102. In some embodiments collection unit 110 comprises a mechanism 124 which is operable to mechanically move a position of the end of hose 122 relative to backstop 102. Mechanism 124 may, for example, comprise a mechanically extendable/retractable jib 125 to which hose 122 is coupled. Hose 122 may be coupled to a lower surface of jib 125 however this is not necessary. As jib 125 is extended hose 122 preferably extends as well. Likewise as jib 125 is contracted hose 122 preferably contracts. Jib 125 may, for example, be extendable from about 15 to about 22 feet.

In some embodiments jib 125 is pivotable via turret 126. Jib 125 may be extended/retracted and/or turret 126 may be pivoted as desired such that any portion of backstop 102 may be reached with hose 122 without an operator having to climb onto backstop 102. In some embodiments turret 126 comprises two degrees of freedom (e.g. left to right and vice versa and up and down and vice versa). Additionally, or alternatively, jib 125 may be extended/retracted to adjust a depth of hose 122 within backstop 102. In some embodiments jib 125 and/or turret 126 are controlled to move hose 122 parallel to an inclination angle of backstop 102.

In some embodiments jib 125 and/or turret 126 are controlled by a user via a user interface (e.g. a control panel, touch screen, remote control, etc.).

In some embodiments jib 125 and/or turret 126 are controlled autonomously to collect material from a desired region of backstop 102. In some embodiments, jib 125 and/or turret 126 are controlled to position hose 122 relative to backstop 102 to collect bullets and backstop material according to a pre-set pattern or plan. Such pre-set pattern or plan may, for example, be retrieved from a data store or dynamically generated. In some embodiments a pattern or plan is designed for a specific backstop 102 to optimize efficiency.

In some embodiments a weighted plate is coupled to the open end of hose 122. The weighted plate may assist with auto-leveling of the open end of hose 122, increase applied surface pressure on the backstop material and/or the like to increase suction efficiency of vacuum 120.

A discharge conduit 128 couples an output of vacuum 120 to an input of separation unit 112.

In some embodiments vacuum 120 is enclosed by an enclosure 129 (e.g. a metal enclosure). In some such embodiments, turret 126 is coupled to a surface of enclosure 129.

Figure 5:
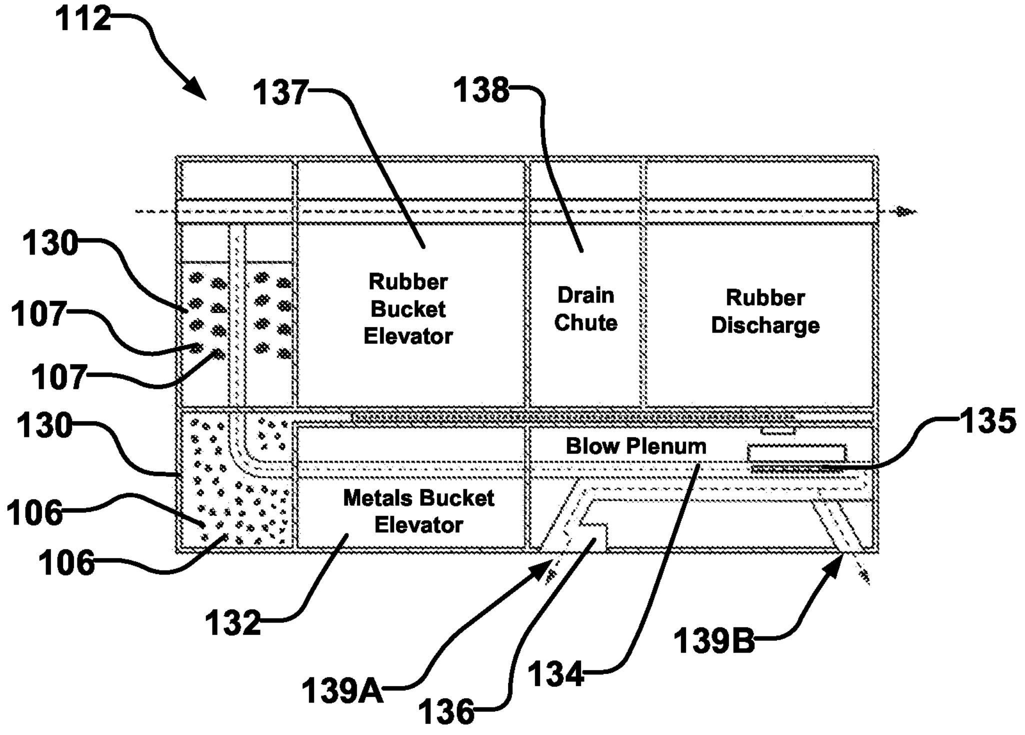

FIG. 5 schematically illustrates an example embodiment of separation unit 112. Separation unit 112 comprises a tank 130 containing a liquid. The collected bullets (e.g. bullets 106) and backstop material (e.g. backstop material 107) are introduced into the liquid. For example, the bullets and backstop material may fall into the liquid.

In the liquid, the bullets are separated from the backstop material based on density as described elsewhere herein. Preferably the liquid has a density that is greater than the density of the backstop material but less than the density of the bullets such that the bullets sink towards a bottom of tank 130 while the backstop material floats on the liquid in tank 130. In some embodiments the liquid is a calcium chloride or silicate solution as described elsewhere herein.

In some embodiments separation unit 112 comprises an intake chute which receives the collected materials from discharge conduit 128 and directs the collected materials into tank 130. In some embodiments the collected materials are agitated while in discharge conduit 128 to further break the collected materials apart. For example, discharge conduit 128 may comprise a metal screen or mesh tray having upwardly pointing protrusions such as spikes, rods, etc. The upwardly pointing protrusions may, for example, be from about 2 inches to about 8 inches tall. A motor may be coupled to the metal screen or mesh tray to agitate the metal screen or mesh tray. Agitating the metal screen or mesh tray may advantageously separate lead or copper fragments which may be wedged between chunks of backstop material or lodged in chunks of backstop material. In some embodiments at least a portion of the agitation occurs below the liquid level of tank 130 (i.e. at least a portion of the metal screen or mesh tray is submerged in the liquid of tank 130).

In some embodiments liquid mist and/or jets (e.g. of the liquid of tank 130) is applied to the collected materials while they are in discharge conduit 128. The mist and/or jets advantageously assists with reducing airborne hazardous particles.

Once the collected bullets and/or collected parts of bullets are separated from the backstop material, the collected bullets and/or collected parts of bullets may be removed from tank 130. Removing the collected bullets and/or collected parts of bullets may be performed continuously or intermittently.

Tank 130 may be configured to collect the bullets and/or collected parts of bullets. Tank 130 may be shaped to direct the bullets and/or collected parts of bullets to an intake of a mechanism operable to retrieve the bullets from tank 130. For example, tank 130 may comprise one or more sloped bottom surfaces (e.g. an angled floor). Once the collected bullets and/or collected parts of bullets sink to the bottom of tank 130, the collected bullets and/or collected parts of bullets may slide down the sloped bottom surface(s) of tank 130. The sloped bottom surfaces in tank 130 may be configured to guide the collected bullets and/or collected parts of bullets proximate to an intake of a mechanism configured to retrieve the bullets from the liquid in tank 130. The mechanism may be operated to retrieve the collected bullets and/or collected parts of bullets from the liquid. In some embodiments the mechanism comprises a bucket elevator (e.g. bucket elevator 132). In some embodiments the mechanism comprises one or more encased augers and/or spiral conveyors. In some embodiments the mechanism comprises liquid or air driven venturi pumps.

Tank 130 may comprise a baffle wall. The baffle wall may separate tank 130 into two parts. Collected bullets may travel from a first part of tank 130 along the sloped bottom surface of tank 130 through a passage in the baffle wall into a second part of tank 130. The baffle wall may advantageously prevent the backstop material from entering the second part of tank 130 and the mechanism configured to retrieve collected bullets from tank 130. Due to the different densities of the collected bullets and the backstop material, the backstop material cannot pass through the passage as the backstop material is buoyant in the liquid of tank 130.

As another example tank 130 may be funnel shaped directing the bullets and/or collected parts of bullets to the intake of the retrieval mechanism.

In some embodiments liquid is removed (e.g. with a pump, drained, etc.) from tank 130. Once a sufficient portion or all of the liquid has been removed, the bullets may be removed from tank 130.

In some embodiments liquid and the collected bullets together are removed from tank 130. The removed fluid and bullets may, for example, be directed up a vertically oriented pipe that empties out over a screen, de-watering tray, sluice box ramp that is sloped away from the pipe discharge, etc. The removed fluid may pass through the screen, de-watering tray, sluice box, etc. and fall back into tank 130 while the bullets and/or parts of bullets may be retrieved from the screen, de-watering tray, sluice box, etc.

The collected bullets may optionally be separated based on type and/or material (e.g. steel bullets may be separated from lead-copper bullets) and/or size. In some embodiments one or more magnets separate steel bullets from other non-magnetic bullets. In some embodiments the mechanism which retrieves the collected bullets from the liquid of tank 130 places the collected bullets onto a vibration tray (e.g. vibration tray 134). One or more magnets (e.g. magnets 135) may be positioned over the vibration tray to remove the steel bullets. Non-magnetic bullets (e.g. lead-copper bullets) may slide down the vibration tray.

In some cases it is advantageous to separate a lead core from a copper jacket or to puncture a copper jacket surrounding a lead core. For example, separating a lead core from its copper jacket may make smelting and/or ingot forming easier, safer (e.g. lead core won't explode due to pressure build-up during the smelting process, etc.), etc. In some embodiments lead-copper bullets slide down the vibration tray into a shredder (e.g. shredder 136) which shreds the lead-copper bullets to separate the lead core from the copper jacket. In some embodiments the shredder comprises a dual cam shredder as described elsewhere herein. The shredded metals may then proceed down a discharge chute (e.g. discharge chute 139A) into a holding receptacle (e.g. drum 103).

The steel bullets are removed from the magnets. The removed steel bullets may proceed down a separate discharge chute (e.g. discharge chute 139B) into a separate holding receptacle (e.g. drum 104). In some embodiments separation unit 112 comprises a scraping mechanism which scrapes the steel bullets from the magnets. In some embodiments the scraping mechanism comprises a fin blade mechanism. In some embodiments the magnets comprise one or more electromagnets. The steel bullets may, for example, be removed from the electromagnets by turning the electromagnets off.

Collected backstop material and gangue material is retrieved from a surface of the liquid in tank 130. In some embodiments separation unit 112 comprises a bucket elevator configured to retrieve the backstop material and any floating gangue material from the surface of the liquid (e.g. bucket elevator 137).

In some embodiments hanging chains which dangle below the surface of the liquid in tank 130 may slow down flow of liquid in tank 130 preventing any metals (e.g. collected bullets and/or parts of bullets) from being directed towards the bucket elevator configured to retrieve the backstop material and gangue material while permitting buoyant material (e.g. backstop material, gangue material, etc.) to pass over the hanging chains and into the bucket elevator.

The retrieved backstop material and gangue material may be dumped onto a drain chute 138.

Drain chute 138 may comprise one or more drain screens. The backstop material and gangue material may bounce off of the drain screens to remove liquid from the backstop material and gangue material. Corresponding drain trays are positioned below each of the drain screens. Liquid drips may be channeled into a sump pump which may pump the collected liquid drips back into tank 130.

In some embodiments filters (e.g. metal screens, fabric filters, etc.) are positioned before the sump pump intake. The filters protect the sump pump from excessive wear, prevent matter which may block the pump from entering the sump pump, etc.

In some embodiments air plenums on a lower surface of the drain trays are coupled to vacuum 120. The air plenums may be designed to force airflow in a downward direction. Downward airflow may assist with drying the backstop material and gangue material. Additionally, or alternatively, the air plenums may assist with moving the backstop material and gangue material along drain chute 138 (e.g. at a faster pace).

The backstop material and gangue material may then be at least partially blow dried. In some embodiments air is obtained from a vacuum system of unit 114. In some embodiments the back stop material and gangue material are retrieved from an end of drain chute 138 with another bucket elevator. The backstop material and gangue material may be blow dried while on the bucket elevator. The bucket elevator discharges the backstop material and gangue material into an intake chute of unit 114.

In some embodiments the liquid of tank 130 is automatically replenished to maintain a constant level. For example, one or more sensors within tank 130 may monitor liquid levels within tank 130. If a level of liquid within tank 130 falls below a pre-set threshold value, the one or more sensors may automatically initiate a process to replenish the liquid. In some embodiments a warning is generated for an operator when a level of liquid within tank 130 falls below a pre-set threshold value.

In some embodiments tank 130 comprises about 200 liters or less of liquid. In some embodiments tank 130 comprises about 50 liters to about 180 liters of liquid.

Figure 6:
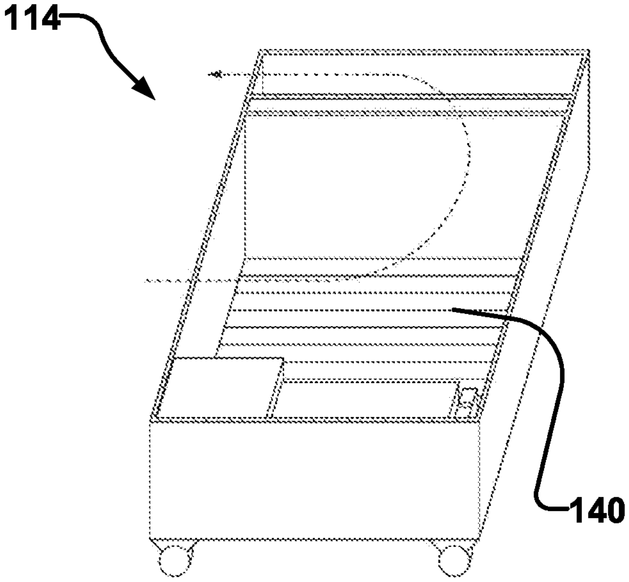

FIG. 6 schematically illustrates an example embodiment of intermediary unit 114 comprising a conveyor belt 140. Conveyor belt 140 transports the backstop material and gangue material from separation unit 112 to material processing unit 116 where the backstop material and gangue material are deposited into an intake chute of unit 116.

As the backstop material and gangue material is being transported between units, the material is dried. For example, one or more vacuum devices may blow air onto the backstop material and gangue material as the backstop material and gangue material is carried by conveyor belt 140 between units 112 and 116. In some embodiments liquid mist or the like (e.g. water mist, the liquid solution of tank 130) is first applied to the backstop material and gangue material on conveyor belt 140 to remove airborne hazardous dust. The liquid may be collected and stored in a waste container, redistributed to tank 130 and/or the like.

Figure 7:
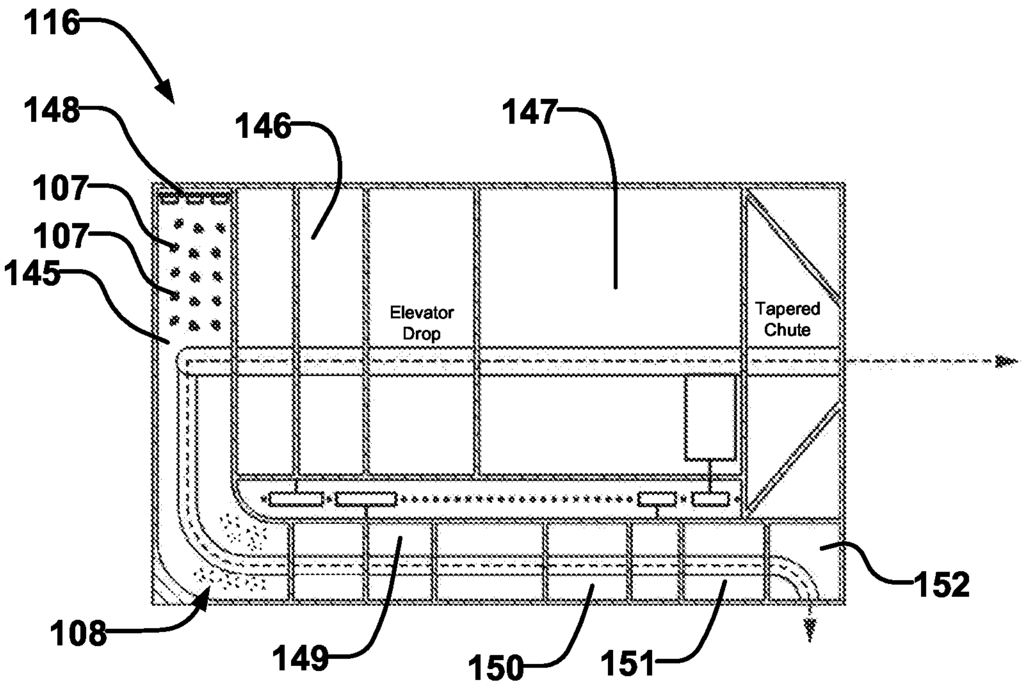

FIG. 7 schematically illustrates an example embodiment of backstop material processing unit 116.

The backstop material (e.g. backstop material 107) and gangue material (e.g. gangue material 108) may be fed into tank 145 via an intake chute. Tank 145 comprises a liquid having a density that is less than the density of the backstop material but greater than the density of the gangue material. The backstop material sinks to the bottom of tank 145. In some embodiments the liquid comprises fresh water. In some embodiments the liquid comprises calcium chloride or silicates as described elsewhere herein.

A mechanism retrieves the backstop material from the bottom of tank 145. In some embodiments the bottom of tank 145 is sloped downwards towards the mechanism. In some embodiments tank 145 is funnel shaped directing the backstop material toward the mechanism. In some embodiments the mechanism comprises a bucket elevator (e.g. bucket elevator 146). The bucket elevator may retrieve the backstop material and deposit the backstop material onto a vibration tray (e.g. vibration tray 147) having a drain screen. Water may then be shaken off the backstop material as it slides down the vibration tray and falls into an intake hopper. The intake hopper may be coupled to an input of application unit 118. In some embodiments the intake hopper is coupled to an input of application unit 118 with a 90° upward sweep.

Floating gangue material (e.g. gangue material 108) in tank 145 may be directed out of tank 145 into a waste container (e.g. drum 105). In some embodiments water jets (e.g. water jets 148) direct the gangue material (e.g. along a surface of the liquid in tank 145) toward another bucket elevator (e.g. bucket elevator 149) or other mechanism such as a skimmer which deposits the gangue material onto a drum conveyor (e.g. conveyor 150) with perforated belting. A series of compression drums (e.g. compression drums 151) may then squeeze excess water (or other liquid) out of the gangue material. The dried gangue material may then be dumped down a discharge chute (e.g. chute 152) into the waste container.

In some embodiments a liquid circulation pump drives the water jets (e.g. water jets 148).

A ballast pump may draw liquid from an externally connected ballast drum to maintain a desired level of liquid within tank 145. In some embodiments the ballast pump is automatically operated based on one or more outputs of sensors configured to monitor a liquid volume within tank 145.

In some embodiments tank 145 comprises about 200 liters or less of liquid. In some embodiments tank 145 comprises about 50 liters to about 180 liters of liquid.

Figure 8:
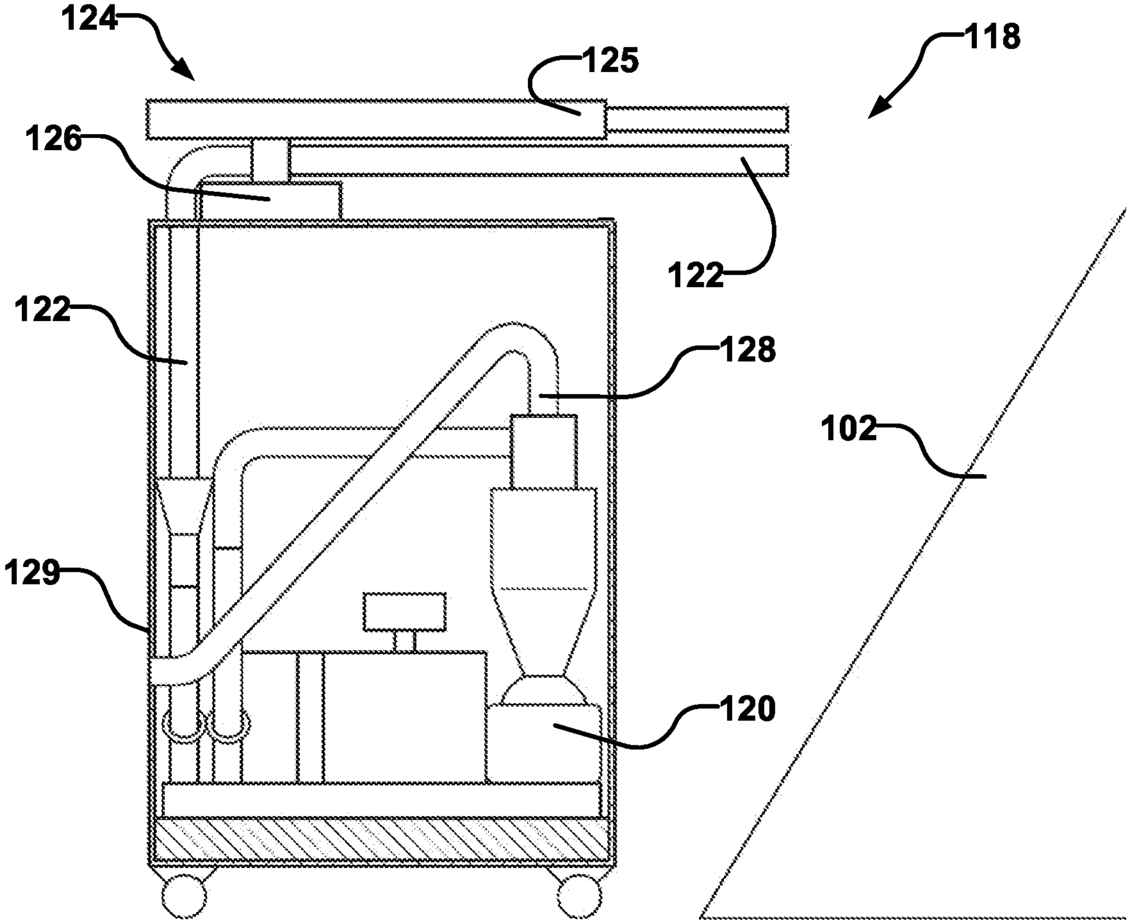

FIG. 8 schematically illustrates application unit 118 which is operable to re-apply the backstop material to backstop 102. Application unit 118 may be like collection unit 110 except that the input and outputs of units 110 and 118 are reversed. For example, in the illustrated example embodiment of unit 118 chute 128 is connected to an intake of vacuum 120 and hose 122 is connected to an output of vacuum 120. As described elsewhere herein, application unit 118 receives the dried backstop material from unit 116 and re-applies it to backstop 102. As described elsewhere herein a position of hose 122 may be manually or autonomously varied.

As described elsewhere herein vacuum 120 may comprise water scrubbing elements and/or filters (e.g. HEPA filters) to prevent hazardous airborne particles from being exhausted from vacuum 120.

In some cases collection unit 110 may be re-configured to be used as application unit 118. System 100 may comprise ducting which can be configured to switch the intake and output ports of unit 110 so that unit 110 may be used as application unit 118. Re-configuring application unit 110 as application unit 118 may reduce a size of system 100, reduce cost of system 100, etc.

In some cases it is desirable to apply brand new backstop material to backstop 102. In some such cases application unit 118 may be used to apply the new backstop material to backstop 102. Application unit 118 may collect the new backstop material directly out of storage packs used to transport the new backstop material (e.g. by placing an intake chute of application unit 118 directly into the storage packs). In some cases new backstop material is spread across a floor of a shooting range and application unit 118 collects the new backstop material from the floor.

In some cases it is necessary to supplement the recovered backstop material when re-applying the recovered backstop material to backstop 102. In some cases it is necessary to add about 5-15% new material. Application unit 118 may apply the recovered backstop material and the brand new material simultaneously or at different times.

In some embodiments system 100 comprises a unitary machine. Such unitary machine may be moved around a site (e.g. a shooting range) as one unit. In some embodiments the unitary machine is wheeled.

In some embodiments system 100 is modular. In some such embodiments different functional units of system 100 may be provided in separable modules which are couplable together. A modular design may assist with maneuvering system 100 within tight and narrow shooting range facilities. In some embodiments each of functional units 110, 112, 114, 116 and 118 corresponds to a module of system 100. In some embodiments two or more functional units 110, 112, 114, 116 and 118 are combined into a single module. Once individual modules are coupled together, system 100 may be transported around a job site as though system 100 was a unitary machine. Each of the individual modules may comprise wheels, casters and/or the like.

To minimize hazardous lead dust or other air borne particles it is advantageous for system 100 to comprise an air-locked system. "Air-locked" means that hazardous particles within system 100 cannot escape out of system 100 into the general site environment. In some embodiments an enclosure encloses system 100 providing an air-locked system. In embodiments where system 100 comprises modules which are coupled together, the coupling between the modules may be air-locked. For example, a first module may comprise a male flange while an adjacent module comprises a female flange couplable with the male flange. The flanges may be fitted with gaskets (e.g. rubber gaskets) to generate an air-locked coupling. In such embodiments, each of the modules may comprise an enclosure. Additionally, or alternatively, seams between modules which are coupled together may be externally sealed with an adhesive backed tape.

In some embodiments mechanical buckles (see e.g. FIG. 2) at least partially secure individual modules together.

In some embodiments a pallet jack or similar system is positioned under system 100 to move system 100 around a job site. For example, the pallet jack may be positioned under select modules of system 100. In some embodiments the pallet jack is motorized. In some such embodiments the pallet jack may be controlled remotely by an operator.

System 100 may be configured to run on conventional electrical power (e.g. 60 Hz 120V or 50 Hz 240V electrical power). In some embodiments system 100 comprises one or more electrical generators (e.g. commercially available gas powered generators or the like) to power system 100.

Individual modules may be transported within a trailer. In some embodiments system 100 may be transported pre-assembled.

Typically, material is collected from backstop 102 in a systematic manner (e.g. left to right and top to bottom, etc.). However, bullets are most commonly located in an oval pattern having a depth of about 4 feet to about 6 feet and centered along a centerline of each shooting lane. Higher power rifle rounds will typically be located deeper within backstop 102 than lower power handgun rounds. In some cases an operator may choose to only collect backstop material and bullets up to a specific depth of backstop 102.

In some embodiments system 100 (e.g. functional unit 110 of system 100) comprises one or more sensors operable to detect presence of bullets within backstop 102. For example, the one or more sensors may comprise metal detecting sensors such as inductive proximity sensors. The inductive proximity sensors may, for example, be located proximate to an end of hose 122. An optimal path for collecting bullets within backstop 102 may be computed based on detected locations of the bullets. In some embodiments system 100 autonomously collects material from backstop 102 based at least partially on the detected bullet locations.

As described elsewhere herein liquids used in a separation process may be treated prior to disposal of the liquids. For example, the liquids may be filtered, distilled, etc. to remove lead or other hazardous chemicals from the liquids. The treated liquids may then be safely disposed of in any manner (e.g. poured into a drain, poured onto soil, etc.). The remaining untreated liquid or sludge solution comprising lead or other hazardous chemicals may be disposed of using any safe method for disposing of such hazardous chemicals.

In some embodiments system 100 comprises a stills basin, settling pond or the like. For example, system 100 may comprise a reservoir (e.g. reservoir 119 shown in FIG. 3) into which liquid comprising hazardous matter such as lead particles may be introduced. The hazardous matter (e.g.

suspended lead particles) may then settle at the bottom of the reservoir and may be safely removed from system 100.

An operator may readily clean, service and/or maintain any of the modules or functional units of system 100 described herein. An operator may wear an appropriate respirator (e.g. an N95 respirator, etc.), gloves, an air-quality sensor, etc. to minimize exposure to any lead dust. In some cases, drain pans and/or containment bubbles may be set up to encapsulate one or more of the modules or functional units to reduce the likelihood of any hazardous liquids and/or air particles escaping from the modules.

In some cases material from substantially all of backstop 102 may be collected prior to any backstop material being re-applied to backstop 102. The backstop material may, for example, be stored on a floor of the shooting range until it is time to re-apply the backstop material to backstop 102.

In some cases liquid in one or more tanks (e.g. tanks 130, 145 described elsewhere herein) may be reduced or emptied prior to transporting system 100. In some cases one or more liquids are pumped out of system 100 and into storage drums prior to transporting system 100.

Non-Limiting Aspects of the Invention

The invention comprises a number of non-limiting aspects. Non-limiting aspects of the invention comprise:

1. A method for recovering bullets from a backstop, the method comprising:
   collecting fired bullets and backstop material from the backstop; and
   separating the collected bullets and backstop material based on buoyancy of the collected bullets and backstop material in a liquid, the liquid having a density that is greater than the density of the backstop material and less than the density of the collected bullets.
2. The method of aspect 1 wherein the liquid comprises a calcium chloride solution.
3. The method of aspect 2 wherein the calcium chloride solution comprises about 0.6:1 by weight to about 4.5:1 by weight of water to calcium chloride.
4. The method of aspect 1 wherein the liquid comprises at least one silicate.
5. The method of any one of aspects 1 to 4 wherein the liquid further comprises a surfactant additive.
6. The method of aspect 5 wherein the additive comprises sodium carbonate.
7. The method of aspect 5 wherein the additive comprises sodium bicarbonate.
8. The method of any one of aspects 1 to 7 wherein the liquid further comprises phosphates or orthophosphates.
9. The method of any one of aspects 1 to 8 wherein the liquid comprises deionized water.
10. The method of any one of aspects 1 to 9 further comprising separating the collected backstop material from gangue material based on buoyancy of the backstop material and gangue material in a second liquid, the second liquid having a density that is greater than the gangue material and less than the density of the backstop material.
11. The method of aspect 10 wherein the second liquid comprises fresh water.
12. The method of aspect 10 or 11 wherein the second liquid comprises a calcium chloride solution.
13. The method of aspect 10 or 11 wherein the second liquid comprises at least one silicate.
14. The method of any one of aspects 10 to 13 wherein the second liquid comprises sodium carbonate or sodium bicarbonate.
15. The method of any one of aspects 9 to 14 further comprising re-applying the separated backstop material to the backstop.
16. The method of aspect 15 comprising drying the separated backstop material prior to re-applying the separated backstop material to the backstop.
17. The method of any one of aspects 1 to 16 further comprising separating the collected bullets based on material composition of the bullets.
18. The method of aspect 17 comprising separating steel bullets from non-steel bullets using magnets.
19. The method of any one of aspects 1 to 18 comprising shredding lead-copper bullets.
20. The method of any one of aspects 1 to 18 comprising puncturing outer copper jackets of lead-copper bullets.
21. The method of any one of aspects 1 to 20 wherein collecting the fired bullets and backstop material comprises vacuuming a selected region of the backstop.
22. The method of any one of aspects 1 to 21 wherein collecting the fired bullets and backstop material comprises mechanically collecting the fired bullets and backstop material from the backstop.
23. The method of aspect 21 comprising autonomously vacuuming the selected region according to a set plan.
24. The method of any one of aspects 1 to 23 comprising determining locations of bullets within the backstop by scanning the backstop using one or more sensors.
25. The method of aspect 24 wherein the sensors comprise inductive proximity sensors.
26. A system configured to perform the method of any one of aspects 1 to 25.
27. The system of aspect 26 wherein the system comprises a plurality of modules which are couplable together, each of the modules configured to perform at least one distinct function.
28. A system for collecting bullets from a backstop, the system comprising:
   an intake configured to receive bullets and backstop material collected from the backstop; and
   a separation tank comprising a liquid having a density that is greater than the density of the backstop material but less than the density of the collected bullets.
29. The system of aspect 28 wherein the liquid comprises a calcium chloride solution.
30. The system of aspect 29 wherein the calcium chloride solution comprises about 0.6:1 by weight to about 4.5:1 by weight of water to calcium chloride.
31. The system of aspect 28 wherein the liquid comprises at least one silicate.
32. The system of any one of aspects 28 to 31 wherein the liquid further comprises a surfactant additive.
33. The system of aspect 32 wherein the additive comprises sodium carbonate.
34. The system of aspect 32 wherein the additive comprises sodium bicarbonate.
35. The system of any one of aspects 28 to 34 wherein the liquid further comprises phosphates or orthophosphates.
36. The system of any one of aspects 28 to 35 wherein the liquid comprises deionized water.
37. Apparatus having any new and inventive feature, combination of features, or sub-combination of features as described herein.

38. Methods having any new and inventive steps, acts, combination of steps and/or acts or sub-combination of steps and/or acts as described herein.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a vacuum, conveyor belt, functional unit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for recovering bullets from a backstop, the method comprising:

collecting fired bullets and backstop material from the backstop;

separating the collected bullets and backstop material based on buoyancy of the collected bullets and backstop material in a liquid, the liquid having a density that is greater than the density of the backstop material and less than the density of the collected bullets; and separating the collected backstop material from gangue material based on buoyancy of the backstop material and gangue material in a second liquid, the second liquid having a density that is greater than the gangue material and less than the density of the backstop material.

2. The method of claim 1 wherein the liquid comprises a calcium chloride solution.

3. The method of claim 1 wherein the liquid comprises at least one silicate.

4. The method of claim 1 wherein the liquid further comprises a surfactant additive.

5. The method of claim 4 wherein the additive comprises sodium carbonate.

6. The method of claim 4 wherein the additive comprises sodium bicarbonate.

7. The method of claim 1 wherein the liquid further comprises phosphates or orthophosphates.

8. The method of claim 1 wherein the liquid comprises deionized water.

9. The method of claim 8 further comprising re-applying the separated backstop material to the backstop.

10. The method of claim 9 comprising drying the separated backstop material prior to re-applying the separated backstop material to the backstop.

11. The method of claim 1 wherein the second liquid comprises fresh water.

12. The method of claim 1 wherein the second liquid comprises a calcium chloride solution.

13. The method of claim 1 wherein the second liquid comprises at least one silicate.

14. The method of claim 1 wherein the second liquid comprises sodium carbonate or sodium bicarbonate.

15. The method of claim 1 further comprising separating the collected bullets based on material composition of the bullets.

16. The method of claim 15 comprising separating steel bullets from non-steel bullets using magnets.

17. A method for recovering bullets from a backstop, the method comprising:

collecting fired bullets and backstop material from the backstop;

separating the collected bullets and backstop material based on buoyancy of the collected bullets and backstop material in a liquid, the liquid having a density that is greater than the density of the backstop material and less than the density of the collected bullets;

wherein the liquid comprises a calcium chloride solution; and wherein the calcium chloride solution comprises about 0.6:1 by weight to about 4.5:1 by weight of water to calcium chloride.

18. A method for recovering bullets from a backstop, the method comprising:

collecting fired bullets and backstop material from the backstop;

separating the collected bullets and backstop material based on buoyancy of the collected bullets and backstop material in a liquid, the liquid having a density that is greater than the density of the backstop material and less than the density of the collected bullets; and shredding lead-copper bullets.

19. The method of claim 18 wherein the liquid further comprises a surfactant additive.

20. The method of claim 18 further comprising separating the collected bullets based on material composition of the bullets.

* * * * *